United States Patent [19]
Masser

[11] 4,322,061
[45] Mar. 30, 1982

[54] TANDEM SPRING SUSPENSION WITH LEAF ROTATION STOP

[75] Inventor: Lloyd D. Masser, Twin Lakes, Mich.

[73] Assignee: Lear Siegler, Inc., Santa Monica, Calif.

[21] Appl. No.: 121,415

[22] Filed: Feb. 14, 1980

[51] Int. Cl.³ .............................................. F16F 1/26
[52] U.S. Cl. ................................. 267/54 R; 267/52; 267/54 A
[58] Field of Search ................ 267/52, 54 R, 54 A, 267/56, 36 R; 280/718

[56] References Cited

U.S. PATENT DOCUMENTS

| | | | |
|---|---|---|---|
| 1,602,387 | 10/1926 | Batz | 267/54 R |
| 1,829,163 | 10/1931 | Sprong | 267/54 R |
| 2,539,091 | 1/1951 | Liuke | 267/54 R |
| 2,587,522 | 2/1952 | Pilkington | 267/52 |
| 2,762,622 | 9/1956 | Van Raden | 267/54 R |
| 3,817,550 | 6/1974 | Young | 280/718 |
| 3,891,197 | 6/1975 | Poulos | 267/52 |

FOREIGN PATENT DOCUMENTS

| | | | |
|---|---|---|---|
| 258314 | 4/1963 | Australia | 267/54 R |
| 724805 | 11/1966 | Italy | 267/56 |
| 151954 | 11/1921 | United Kingdom | 267/54 R |

*Primary Examiner*—Edward R. Kazenske
*Attorney, Agent, or Firm*—Varnum, Riddering, Wierengo & Christenson

[57] ABSTRACT

A leaf spring suspension assembly (12) for a truck or trailer (18) includes a plurality of leaf springs (20) arranged in a vertical relationship. The leaf springs (20) are mounted to a vehicle through a trunnion assembly (28) which permits for flexure of the ends of the springs (20) to which wheels (16, 18) are attached. The ends of the leaf springs (20) are mounted in an axle connection (26) comprising a housing. The lower leaf (64) of the leaf spring assembly (20) is seated against a base plate (52) of the axle connection (26) and is restrained against movement relative thereto by pairs of pins (90) or cups (72) disposed between the spring (64) and the base plate (52). Cups (74) or pins are also disposed between adjacent springs of the leaf spring assembly (20) to restrain longitudinal movement therebetween. In this way, pivoting of the ends of the leaf springs (20) relative to the axle (16, 18) is minimized which reduces the stressing on the springs as well as the axle connection during turning or braking of the vehicle. Additionally, the double pin (90) or cup (72) arrangement provides a means for retaining the leaf springs within the housing (50). In an alternate embodiment, the center portions of the leaf springs are provided with pairs of cups (90, 92) which prevent fanning or spreading of the leaves.

5 Claims, 5 Drawing Figures

TANDEM SPRING SUSPENSION WITH LEAF ROTATION STOP

BACKGROUND OF THE INVENTION

1. Field of the Invention

This invention relates to leaf spring suspension systems for trucks and trailers and the like wherein the leaves are mounted to prevent relative movement therebetween.

2. State of the Prior Art

Trucks and trailers typically employ multiple leaf-type vehicle suspensions in which a pair of axles are coupled to a trailer or truck bed through a load bearing trunnion. The axles are mounted at the ends of leaf springs which are secured at the central portion to the trunnion. The axles, which are secured at opposite ends of the leaf springs, are coupled to the leaves through axle housing connections. The end portions of the leaf springs are retained within the axle connection to permit motion therebetween.

During the operation of the truck or trailer, the springs are subjected to a relatively large flexing movement typically occurring during cornering of the vehicle or application of the brakes. Therefore, a certain amount of flexure is required between the springs so that some sliding movement between the leaves must be allowed. The turning of a vehicle, however, applies a lateral force on the leaf springs which subjects them to torsional stressing. This lateral force, which also stresses the axle connection housing, may lead to yielding or cracking at the end of the spring. Additionally, the lateral force tends to cause fanning or spreading of the springs.

One well-known spring mounting is disclosed in U.S. Pat. No. 2,539,091, issued Jan. 23, 1951, to Linke. In the Linke patent, a leaf spring suspension is retained in an axle connection which includes an upwardly extending pin received in apertures in the lower springs. Additionally, the lowermost springs include a hooked or curved end portion which aids in retaining the lowermost spring in the housing. The upstanding pin and the hooked end portion reduce relative movement between the springs as well as provide for safety by retaining the springs within the housing. If the lowermost spring should break, the pin, which is disposed within the two lower leaves, would prevent the leaves from sliding out of the axle connection.

The Van Raden U.S. Pat. No. 2,762,622, issued Sept. 11, 1956, also discloses a mounting for the end of a leaf spring suspension. The axle connection includes a base plate having an upstanding pin which is received within apertures in the lower springs of the leaf spring suspension. The pin has a convex surface portion which permits some longitudinal and transverse movement of the spring with respect to the base without inducing stresses within these springs. The pin extends into the two lowermost leaf springs so that if the pin breaks off at the base, longitudinal movement of the springs will be restrained relative to each other. In this way, the springs are prevented from slipping out of the housing.

The Linke and Van Raden patents both disclose spring retention means for the end of a leaf spring suspension system. The retention means prevents disengagement of the springs from the housing if the main leaf breaks and permits some flexing movement of the leaves during operation of the truck or trailer.

The Young U.S. Pat. No. 3,817,550 discloses a vehicle suspension system wherein the center portions of each spring include a cup seated in a recess in an adjacent spring and an aperture for receiving a bolt. The cup and bolt tend to maintain the springs in a vertical stack and limit lateral movement.

DESCRIPTION OF THE INVENTION

In accordance with one embodiment of the invention, the ends of a leaf spring suspension system for a vehicle are retained in a housing having a base plate against which the lowermost spring in the leaf spring suspension is seated. The leaves are arranged in a stacked relationship and may comprise two or more such spring leaves. The axle connection housing receives the ends of the leaf springs so as to retain them in the stacked relationship relative to the axle. In order to limit displacement between the springs in the suspension and also between the base plate of the housing and the lowermost leaf spring, pin means are disposed between the base plate and the adjacent leaf spring and between the two lowermost leaf springs. In this way the pins retain the leaf springs in their relationship relative to the axle and relative to each spring. The pins also retain the leaf springs within the housing of the axle connection.

The use of a double pin arrangement maintains the ends of the leaf springs perpendicular to the axle during turning and braking of the vehicle. In this way, the lateral forces created during turning of the vehicle are compensated for by the pins.

In one form of the above invention, at least one cylindrical pin is seated in the base plate of the axle connection and is received in a recess of the adjacent leaf spring. The leaf springs include integrally formed cups which are received in adjacent recesses in the next leaf. Typically, two cylindrical pins are disposed between the bearing plate and the lowermost leaf and two cups are disposed between adjacent leaf springs. Alternatively, one pin and one cup may be disposed between the base plate and the lowermost leaf.

In another form of the above invention, cups are disposed between the base plate and the lowermost spring and also between adjacent leaf springs to prevent relative movement therebetween. In order to provide limited flexure of the springs, the recesses in which the cups are received are slightly larger than the cups. An elastomeric pad also may be included within the axle housing for limiting vertical displacement of the leaf springs.

In a second embodiment of the invention, the vertical stack of springs, which includes at least two such leaf springs are provided with means for limiting displacement between adjacent leaves, typically in the form of two pins or cups. The pins or cups, spaced longitudinally along each spring, limit lateral movement between springs and thereby prevents fanning or spreading of the stack of leaf springs.

BRIEF DESCRIPTION OF THE DRAWINGS

The invention will be described with reference to the accompanying drawings wherein like members bear like reference numerals in which.

DETAILED DESCRIPTION OF THE PREFERRED EMBODIMENTS

Figure 1:
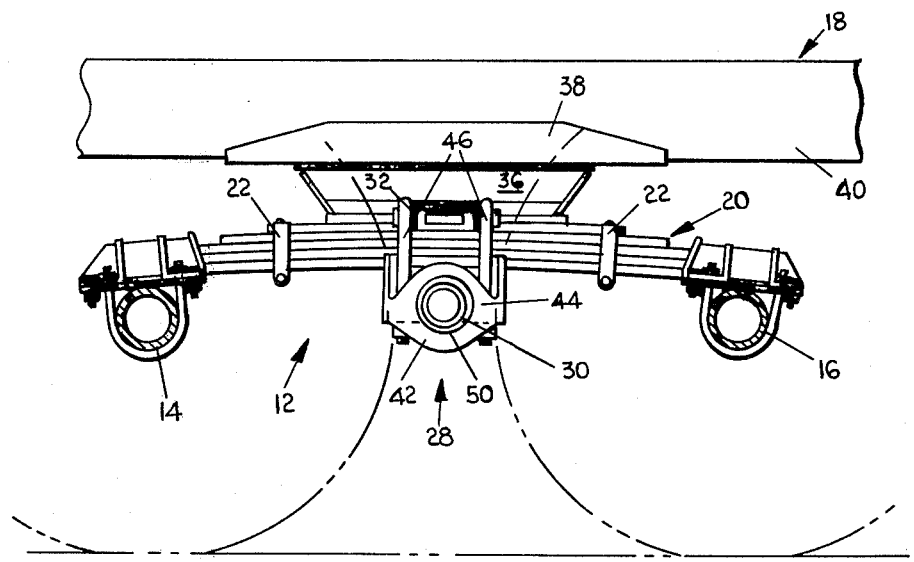
FIG. 1 is a side elevational view of a suspension system including a leaf spring suspension according to the present invention.

With reference to FIG. 1, a suspension system 12 for trailers, tractors, and the like is shown. The suspension system is similar to that shown in U.S. Pat. No. 3,817,550 issued June 18, 1974, to Young. Generally, the suspension system is used on each side of the tractor or trailer.

The suspension system 12 includes a pair of axles 14 and 16 coupled to a trailer bed 18 through a load bearing cylindrical support 30 known as a trunnion axle. Wheels, shown in phantom lines in FIG. 1, are mounted in a conventional fashion to each of the axles.

The suspension system comprises a spring assembly 20 including a plurality of conventional spring leaves held in cooperative relationship by brackets 22. Axle connections 26 are provided on each end of the spring assembly to couple the spring assembly to the axles. The trunnion assembly 28 is secured to a central portion of the spring assembly 20 for coupling the spring assembly 20 to the trunnion axle 30. The trunnion axle 30 extends through the trunnion assembly 28 and has nonrotatably secured thereto a trunnion clamp 32. A bracket 36 is welded to the bed of the trailer and depends therefrom. The bottom portion of the bracket 36 is welded to the trunnion clamp 32. A flange 38 is secured to the top of the bracket 36 and to a longitudinal support member 40 of the trailer bed 18. The trunnion assembly 28 typically includes a cap 42 and a spring seat 44 which are secured about the trunnion axle 30 by U-bolts 46. A yieldable and compressible annular bushing 50 is provided between the trunnion axle 30 and the trunnion cap 42 and spring seat 44. The above-described structure is well-known in the art of suspension systems and comprises a typical leaf spring suspension on which the connection which will be discussed below is used.

Figure 2:
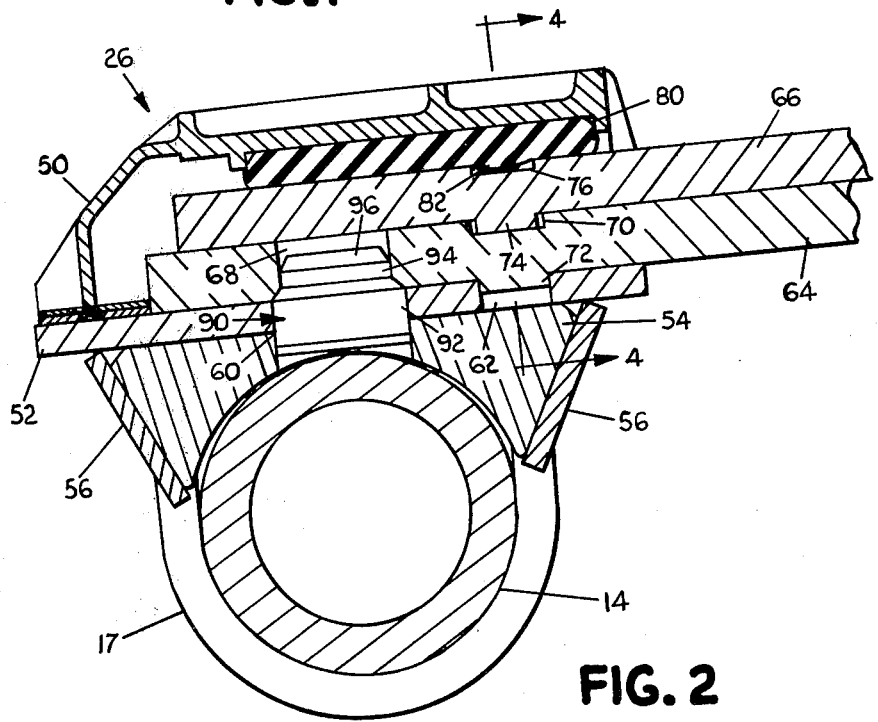
FIG. 2 is a partial side cross-sectional view of one embodiment of leaf spring end connection in accordance with the invention.

With reference to FIG. 2, the axle connection 26 comprises a housing 50 for the ends of the springs 20. The housing 50 is typically formed by casting and has a generally U-shaped cross-section. The housing 50 is closed by a base plate 52 from which flanges 54 depend. End plates 56 are disposed perpendicular to the ends of the flanges 54 to provide a seat in which the axle 14 is mounted. The axle 14 is retained on the axle connection by U-bolts 17.

The connection between the ends of the leaf springs and the axle connection housing 50 is provided by the pin or cup members which are received in corresponding recesses in adjacent leaf springs as will be discussed below. The base plate 52 of the spring end housing includes recesses or apertures 60 and 62. The apertures are formed within the base plate 52 during a forging or casting operation. Adjacent the base plate 52 is the lower leaf 64 which is seated thereagainst. The leaf spring 64 includes an aperture 68, a recess 70 and an extending cup member 72 all integrally formed therewith. The aperture, recess and cup are typically hot punched into the leaf spring so that the formation of the recess 70 also forms the extending cup 72.

The second leaf spring 66 also includes a depending cup member 74 and an integrally formed recess 76. Both leaf springs 64 and 66 are received in the spring end housing 50 and retained therein in a manner to be described below. Although the drawings depict two such leaf springs, a greater number of leaves may be included in the suspension system if it is necessary to support a greater load. Disposed within the housing 50 and above the upper leaf 66 is an elastomeric pad 80 typically made of rubber. The pad provides for limited vertical movement of the springs during flexure of the leaf spring assembly. A depending cup 82 may be formed in the pad which function will be described below.

In order to limit movement of the leaf spring relative to the base plate and between adjacent leaf springs, a pin member 90 is seated within the recess 60 in the base plate. The pin 90 includes a base portion 92 which is fixedly secured within the base plate 52 and an upper pin portion 94 having a frusto-conical end portion 96. The pin 90 provides a connection between the housing 50 and the lowermost leaf 64 of the leaf spring assembly. In this way, relative movement between the base plate 52 and lower spring 64 is minimized. A second connection between the base plate 50 and the spring 64 is also provided in the form of depending cup 72 which is received in recess 62 in the base plate. In this way, a double connection between the base plate and spring is provided. The double connection serves to retain the leaf spring within the housing. The double locking arrangement also minimizes rotation of the lower spring 64 relative to the base plate 52 and axle, thereby reducing loading of the springs into the housing 50.

A connection between adjacent springs of the leaf spring assembly 20 is also provided in a form of depending cup 74, which is received in recess 70 of the lowermost leaf 64. As can be seen in FIG. 2, the recess 70 is slightly larger than the cup 74 so as to permit limited movement of the cup 74 within the recess. In this way, flexure of the springs can be accomodated. The elastomeric pad 80 disposed above the uppermost spring 66 also includes a cup portion 82 received in recess 76. This cup 82 also limits relative movement between the spring and the adjacent pad.

The frusto-conical portion 96 of the pin 90 also provides for limited movement of the springs relative to each other in that the frustum is spaced from the edges of the recess. In this way the spring can experience limited movement without the cup bearing against the pin. The upper surface of the frusto-conical portion 96 is spaced from the lower surface of leaf 66 in order to allow for flexing of the spring.

Figure 3:
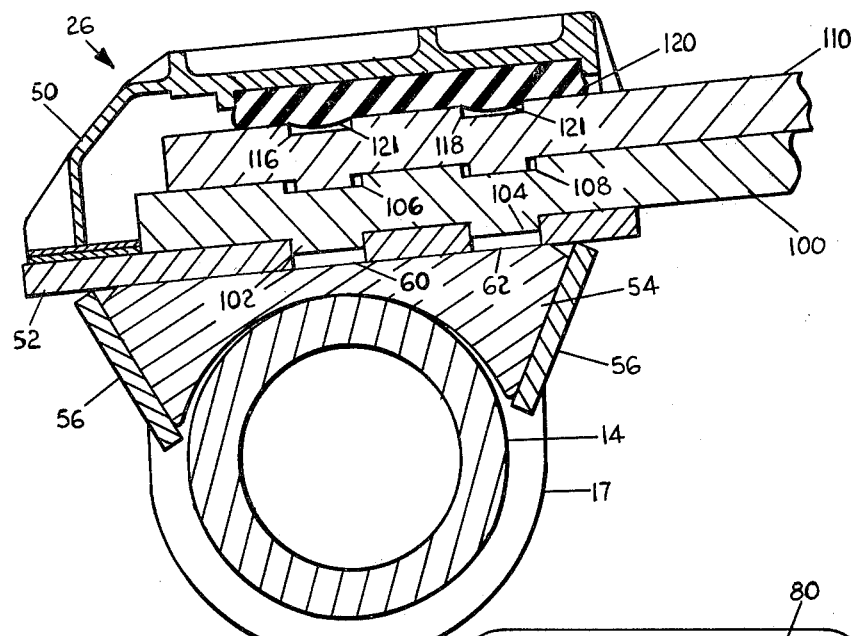
FIG. 3 is a partial side cross-sectional view of a second of the leaf spring end connection in accordance with embodiment of the present invention.

A second form of the invention is shown in FIG. 3, wherein a double cup arrangement is used between adjacent leaf springs and between the lowermost spring 64 and the base plate 50 of the housing. In this way, the need for a separate pin, such as described above, is eliminated. The double cup arrangement also provides the necessary locking between adjacent springs to prevent pivoting of the springs relative to the axle as well as preventing loss of the spring assembly in case the lower leaf breaks.

With reference to FIG. 3, leaf spring 100 includes depending cups 102 and 104 integrally formed therewith and recesses 106 and 108 formed in the upper portion of the spring. As described above, the cups and recesses are typically formed during a hot punching operation during manufacturing of the leaf. The leaf 110 disposed above the lowermost leaf 100 also includes pairs of cups 112 and 114 and recesses 116 and 118. Disposed above the upper spring 110 is an elastomeric pad 120 typically formed of rubber which may include cups 121. The housing 50 in which the ends of the leaves are seated is identical with that described above and includes base plate 52 having apertures 60 and 62 therein.

The lowermost leaf 100 is seated against the base plate 52 so that the cups 102 and 104 are received in the corresponding recesses 60 and 62. In this way, longitudinal movement of the spring 100 relative to the base plate and axle is restricted. The leaf 110 is also seated against the lowermost leaf 100 so that the cups 112 and 114 are seated in the corresponding recesses 106 and 108. As can be seen in the drawing, the recesses 106 and 108 are slightly larger than the cups 112 and 114 to thereby permit limited movement of the leaf 110 relative to the leaf 100. The elastomeric pad 80 also includes cups 120 which are seated in the recesses 116 and 118 formed at the uppermost surface of spring 110. These cups and the pad 80 also serve to limit longitudinal movement of the leaf springs relative to the axle and housing.

Figure 4:
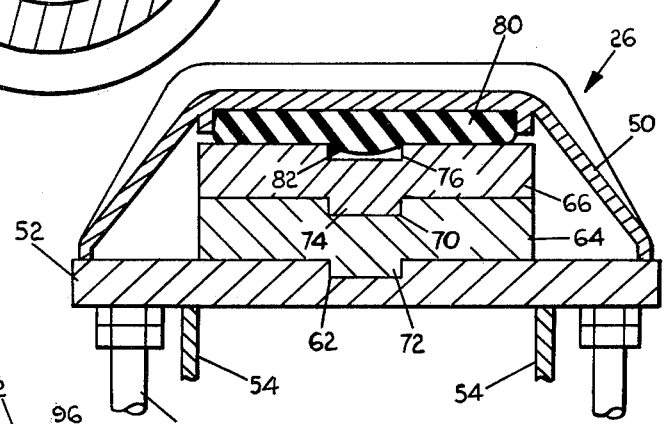
FIG. 4 is an end cross-sectional view taken along lines 4—4 of FIG. 3.

FIG. 4 is a cross-sectional view of the axle connection showing the cup and recess arrangement. As can be seen in the drawing, the axle 14 is retained to the connection by U-bolts and the cups or pins prevent rotation of the ends of the springs relative to the axle. The recesses in which the cups or pins are received are preferably of a width equal to that of the cups in order to prevent lateral movement thereof. In this way, movement of the cups is restricted to longitudinal sliding which may occur during flexure of the springs.

Figure 5:
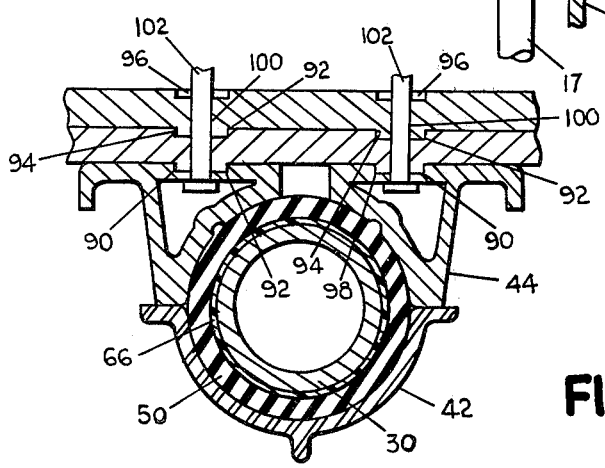
FIG. 5 is a partial side cross-sectional view of the center of a leaf spring suspension in accordance with the present invention.

FIG. 5 is a cross-sectional view of the connection of the center portion of the leaf springs to the trunnion. The trunnion housing includes a cap 42 and a seat 44 which receives axle 30, mounting the spring suspension to the vehicle through U-bolts 17. An elastomeric bushing 50 is typically disposed between the axle 30 and the cap and seat assembly 42, 44. A liner 66 may be positioned between the axle 30 and the bushing 50.

The center of each spring is provided with respective pairs of cups 90, 92 and recesses 94, 96. When the stack of leaf springs is assembled, the cups are received in corresponding recesses in the adjacent leaf. In this way, relative movement between springs is limited. The cups 92 in the lowermost leaf may be received in corresponding recesses 98 in the trunnion axle housing 42, 44. The cups and recesses are formed in the manner described above with reference to the mounting for the ends of the leaf springs. If it is desired, the center portion of each cup may be provided with an aperture 100 through which a bolt 102 may be inserted. The bolt provides added rigidity to prevent fanning of the leaves.

The cups and recesses are shown at the portion of the leaf spring adjacent the trunnion. Alternatively, sets of cups and recesses may be spaced along the length of each spring to prevent fanning or spreading. In such a configuration, the brackets 22 may be eliminated, as the cups will maintain the desired vertical orientation of the springs.

The double pin or cup arrangement, or combination of pin and cup, serves to limit pivoting movement of the ends of the springs relative to the axle. As a vehicle corners or brakes, a lateral force is created which causes the ends of the springs to bear against the housing 50. The double pin or cup arrangement maintains the springs perpendicular relative to the axle by resisting the lateral force. The double locking arrangement between the base plate and the lowermost spring of the leaf spring assembly and between adjacent springs serves to minimize this pivoting movement. In this way, side loading of the springs into the casting which comprises the housing 50 is reduced and the axle is maintained perpendicular to the springs.

The use of the pins or cups between the springs and between the axle connection in the lower spring, provides a safe connection to the suspension assembly. The pins or cups retain the ends of the spring within the housing 50 to thereby secure the springs to the suspension system. The connection between adjacent springs of the leaf spring assembly also retains the spring assembly within the housing.

Although FIGS. 2 through 4 show only two springs used in the spring assembly, a greater number of springs may be employed such as shown in Pat. No. 3,817,550 described above. If it is desired, cups or pins may be arranged between the remaining adjacent leaves of the leaf spring assembly in order to restrain movement between each spring.

The pins or cups disposed at the center of each leaf spring provide a secure connection between adjacent leaves. In this way, spreading or fanning of the leaves is minimized and the lateral load exerted on the U-bolts which secure the spring assembly to the trunnion is reduced. The cups typically would be provided on each leaf of the suspension so that a connection is formed between all adjacent leaves.

Although the cups and pins are shown having a generally cylindrical shape with a circular cross-section, a square pin or cup may also be used. Additionally, the slot or recess in the leaves in which the pin or cup is received is also preferably elongated to allow for the sliding during flexing of the spring while preventing lateral or transverse movement. It is necessary to make the recess in the upper springs of the leaf spring assembly slightly larger than the size of the cups in order to accomodate the flexing of the springs.

The drawings also show the cups as integrally formed with the upper of two adjacent springs and extending into a corresponding recess in the lower spring. The orientation of the cups and pins may be reversed so that the pins extend from the top surface of a leaf. The operation and function of the springs and cups is unchanged if the relative positions of the springs and cups are reversed.

The foregoing specification and drawings are illustrative to the present invention and are intended to illustrate preferred embodiments of the invention. Variations and changes which are obvious to one skilled in the art may be made without departing from the scope and nature of the invention which is defined in the appended claims.

The embodiments of the invention in which an exclusive property or privilege is claimed are defined as follows:

1. In a mounting for the ends of a leaf spring suspension for an axle comprising:
   a housing including a bearing plate;
   at least two leaf springs arranged in a vertically stacked relationship, said leaf springs having end portions received in said housing and seated on said bearing plate;
   means for limiting relative displacement between each of said at least two leaf springs and between said bearing plate and a first leaf spring adjacent thereto;

the improvement which comprises:

said means for limiting relative displacement including first pin means disposed between said bearing plate and said first leaf spring and second pin means spaced from said first pin means and disposed between said at least two leaf springs;

said second pin means including two cups integrally formed in one leaf of said at least two leaf springs and received in corresponding recesses in an adjacent leaf of said at least two leaf springs;

said recess having an elongated configuration, thereby allowing sliding of said cups in said recesses along the length of said leaf during flexure of said leaves.

2. The mounting of claim 1 wherein said cups have a generally annular configuration.

3. The mounting of claim 1 wherein said first pin means comprises two cups integrally formed with said first leaf spring and received in recesses in said adjacent bearing plate.

4. The mounting of claim 3 including elastomeric means in said housing which provides for limited vertical displacement of said leaf springs.

5. The mounting of claim 4 wherein said elastomeric means is a rubber pad arranged adjacent and above the end portion of the upper leaf spring of said vertically-stacked leaf springs.

* * * * *